United States Patent [19]
Schuyler

[11] Patent Number: 5,458,720
[45] Date of Patent: Oct. 17, 1995

[54] METHOD AND STRUCTURE FOR SEPARABLY AND ADHESIVELY BONDING TWO PARTS TOGETHER IN SUCH A MANNER THAT ANY REMAINING ADHESIVE CAN BE EASILY REMOVED AFTER THE PARTS HAVE BEEN SEPARATED

[75] Inventor: Martin Schuyler, Hastings-on-Hudson, N.Y.

[73] Assignee: Cox & Company, Inc., New York, N.Y.

[21] Appl. No.: 120,284

[22] Filed: Sep. 13, 1993

[51] Int. Cl.⁶ ........................................... B32B 7/06
[52] U.S. Cl. .................. 156/290; 156/98; 156/247; 156/344
[58] Field of Search .................. 156/94, 98, 101, 156/155, 247, 254, 289, 344, 179, 290, 291; 428/40, 41, 43, 105, 109, 110, 112, 196, 204, 209, 292, 295; 244/134 R, 134 A, 134 D, 134 E

[56] References Cited

U.S. PATENT DOCUMENTS

| | | | |
|---|---|---|---|
| 2,636,835 | 4/1953 | Boulware et al. | 428/292 |
| 3,501,797 | 3/1970 | Nappi | 428/40 |
| 3,888,711 | 6/1975 | Breitner | 156/179 |
| 4,287,012 | 9/1981 | Midgley et al. | 156/344 |
| 4,338,970 | 7/1982 | Krackeler et al. | 156/155 |
| 4,549,063 | 10/1985 | Ang et al. | 428/43 |
| 4,572,755 | 2/1986 | Åhs | 156/247 |
| 4,824,498 | 4/1989 | Goodwin et al. | 156/344 |
| 4,867,820 | 9/1989 | Jacobson et al. | 156/101 |
| 5,221,390 | 6/1993 | Persson et al. | 156/179 |

FOREIGN PATENT DOCUMENTS

| | | | |
|---|---|---|---|
| 2451288 | 5/1975 | Germany | 156/155 |
| 0012831 | 1/1984 | Japan | 156/344 |
| 3217056 | 9/1988 | Japan | 156/344 |

*Primary Examiner*—Michael W. Ball
*Assistant Examiner*—Daniel J. Stemmer

[57] ABSTRACT

Two parts are adhesively bonded together in such a manner that after the parts have been separated, any remaining adhesive can be easily removed. This is done by placing a flexible cable-containing layer of adhesive between the two parts. The cable is arranged in a serpentine pattern and has a free end which is outside the layer.

7 Claims, 5 Drawing Sheets

METHOD AND STRUCTURE FOR SEPARABLY AND ADHESIVELY BONDING TWO PARTS TOGETHER IN SUCH A MANNER THAT ANY REMAINING ADHESIVE CAN BE EASILY REMOVED AFTER THE PARTS HAVE BEEN SEPARATED

BACKGROUND OF THE INVENTION

The invention relates to adhesive bonding and more particularly relates to removably bonding two parts together using adhesive. In its most immediate sense, the invention relates to separably adhesively bonding two parts together in such a manner that once the parts have been separated from each other, any remaining sections of the adhesive layer are so small that they can be easily removed.

In certain aerospace applications, parts are bonded together with adhesive and this can cause difficulty if one of the parts fails. For example, a heater blanket may be bonded to a metal vane using polysulfide rubber adhesive. If the blanket fails, it must be replaced. This is a labor- and time-intensive task because a) the adhesive is generally quite strong, b) the blanket may come apart when it is pulled off and c) the part may be of a shape which is not easily removed by peeling (e.g. the part may have a double curvature).

It has been proposed to provide in advance for easy separation between two such adhesively bonded parts. In accordance with this proposal, a serpentine pattern of flexible cable (for example, piano wire) is placed in the adhesive layer before the layer has cured and before the blanket is mounted to the vane. One end of the piano wire projects out of the adhesive. To separate the blanket from the vane, the wire is pulled out. When this happens, the wire cuts the adhesive and makes it possible to remove the blanket without pulling on the blanket itself. This reduces the breakup of the blanket during removal, and reduces the quantity of material remaining on the vane. This in turn makes the removal task easier.

This technique has not been entirely successful. This is because after the blanket has been separated from the vane, a regular pattern of large adhesive patches still remains on the vane. These patches are difficult to remove because they are so large.

It would be advantageous to separably adhesively bond two parts together in such a manner that any remaining adhesive can be easily removed after the parts have been separated.

One object of the invention is to provide a method and an adhesive structure which will separably adhesively bond two parts together in such a manner that after the parts have been separated, so little adhesive remains that it can be easily removed.

Another object of the invention is, in general, to improve on known methods and structures of this general type.

In accordance with the invention, the known proposal is modified by arranging the cable to have a particular pattern. This is a serpentine pattern having two opposed ends. The pattern has endpoints along those ends. The distance between adjacent unconnected endpoints is small with respect to the distance between adjacent connected endpoints, and the adjacent unconnected endpoints at one end of the pattern are located intermediate adjacent connected endpoints at the other end of the pattern.

In one preferred embodiment, the cable is arranged in generally straight line segments which bound acute angles. Advantageously, and in accordance with the preferred embodiment, the cable is made of several wires which are twisted together.

BRIEF DESCRIPTION OF THE DRAWINGS

The invention will be better understood with reference to the following illustrative and non-limiting drawings, in which.

DETAILED DESCRIPTION OF PREFERRED EMBODIMENTS

Figure 1:
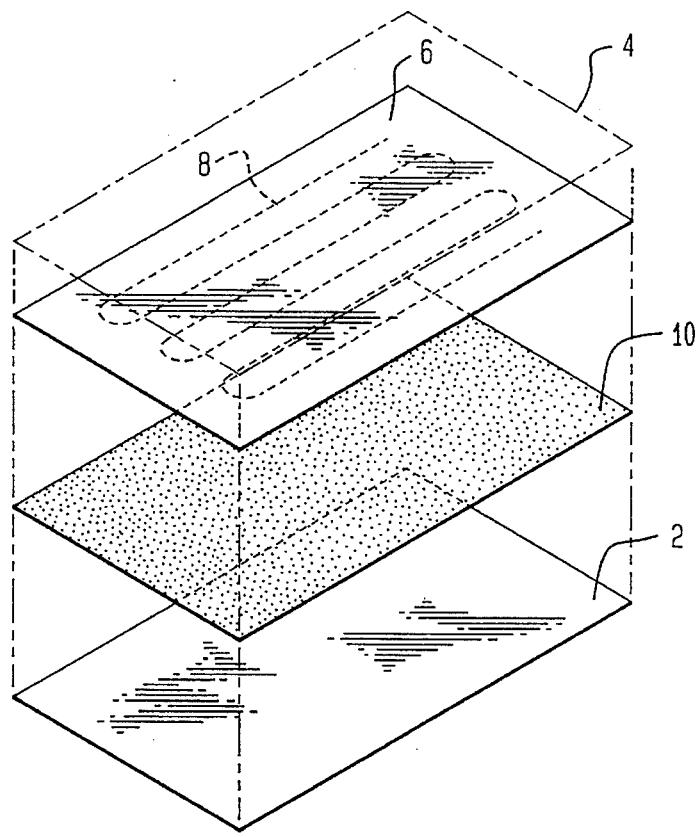
FIG. 1 schematically shows how a heater blanket may be bonded to a blade or vane using adhesive.

The Figures are not to scale; they are exaggerated for clarity. In all Figures, the same elements are indicated by the same reference numerals. In the description below, a preferred embodiment of the invention is described in an application wherein the breeze surface of a vane 2 is protected by an erosion shield 4 made e.g. of aluminum.

With reference to FIG. 1, a heater blanket generally indicated by reference numeral 6 contains conductors 8. The conductors 8 produce heat when the heater blanket 6 is electrically energized. Such heat can be used to keep the erosion shield 4 free of ice (anti-icing protection) or to periodically remove ice accreted upon the erosion shield 4 (de-icing protection). Conventionally, such heater blankets 6 are bonded to such vanes 2 using a layer 10 of adhesive. One suitable adhesive is polysulfide rubber.

If one or more of the conductors 8 fails, the blanket 6 will not function properly. The blanket 6 and erosion shield 4 must then be replaced. This is an expensive task which requires tedious and time-consuming skilled labor; the blanket 6 and erosion shield 4 must be stripped off and the layer 10 of adhesive must be removed (as by abrasion) without damaging the vane 2.

Figure 2:
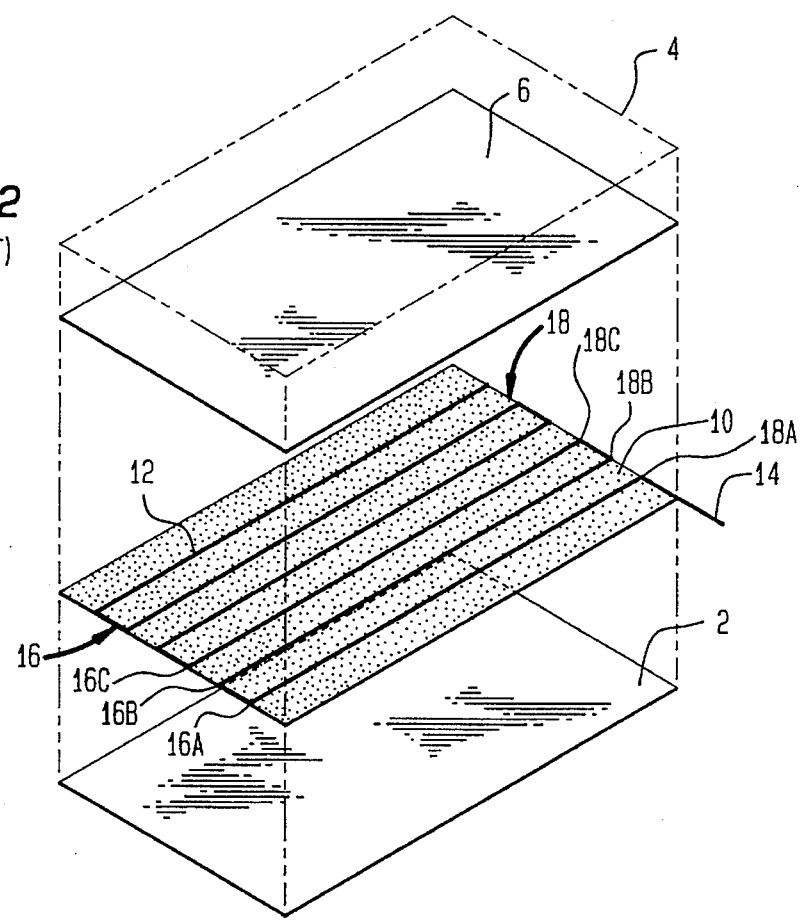
FIG. 2 schematically shows a known technique wherein the layer of adhesive contains piano wire to facilitate removal of the heater blanket from the blade or vane.

It has been proposed (see FIG. 2) to prepare in advance for the separation of the blanket 6 and erosion shield 4 from the vane 2. In accordance with this proposal, a flexible cable 12 (which may be piano wire) is placed in the layer 10 of adhesive, leaving one cable end 14 free. The cable 12 is arranged in a serpentine pattern all over the layer 10. In the proposed pattern, the cable 12 runs back and forth between endpoints 16A, 16B, 16C etc. which are at the left end 16 and the endpoints 18A, 18B, 18C etc. which are at the right end 18. The pattern is composed of straight line segments which are at right angles to each other. In accordance with this proposal, when a repairman pulls upon the cable end 14, the cable 12 cuts through the layer 10 of adhesive, thereby breaking the adhesive bond between the vane 2 and the blanket 6 and making it easy to remove the blanket 6 and erosion shield 4. As shown in FIG. 2, the blanket 6 and the vane 2 are generally flat, and the cable 12 is pulled parallel to them. The flatness of the blanket 6 and the vane 2 is shown for clarity, but is not required.

Experiments carried out using this proposal have shown that a pattern of relatively large regions R of adhesive is left intact after the cable 12 has been pulled free. This is shown in FIG. 3.

Figure 3:
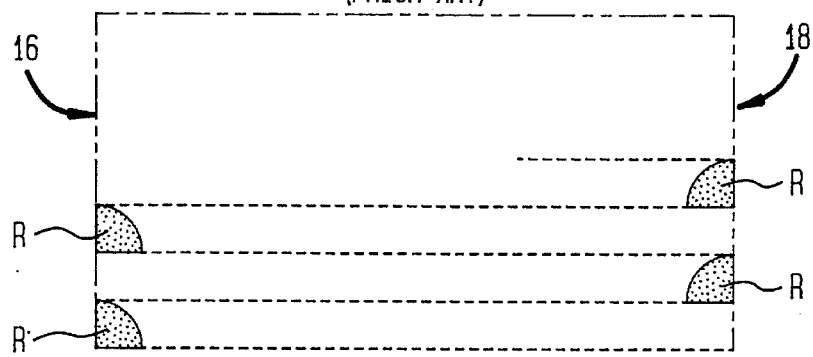
FIG. 3 schematically shows how the known FIG. 2 technique leaves a regular pattern of comparatively large residual bonded areas on the blade or vane.
Figure 4A:
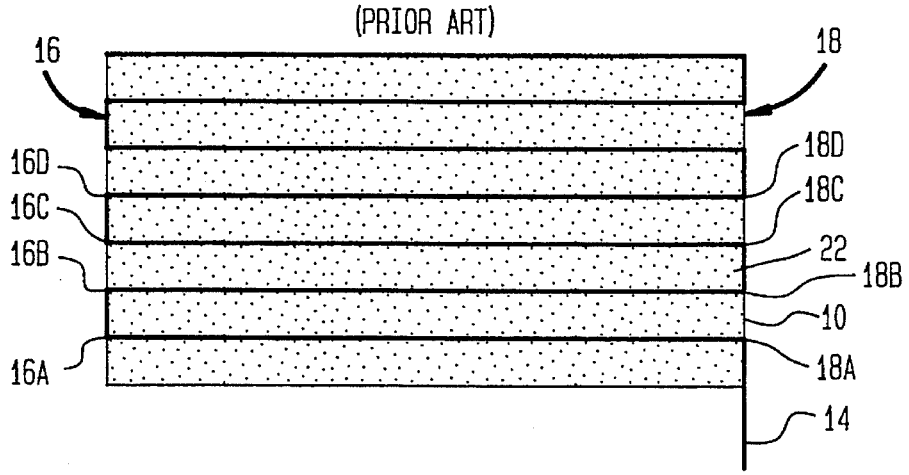
FIGS. 4A–4G schematically explain why the FIG. 3 pattern is produced.
Figure 4B:
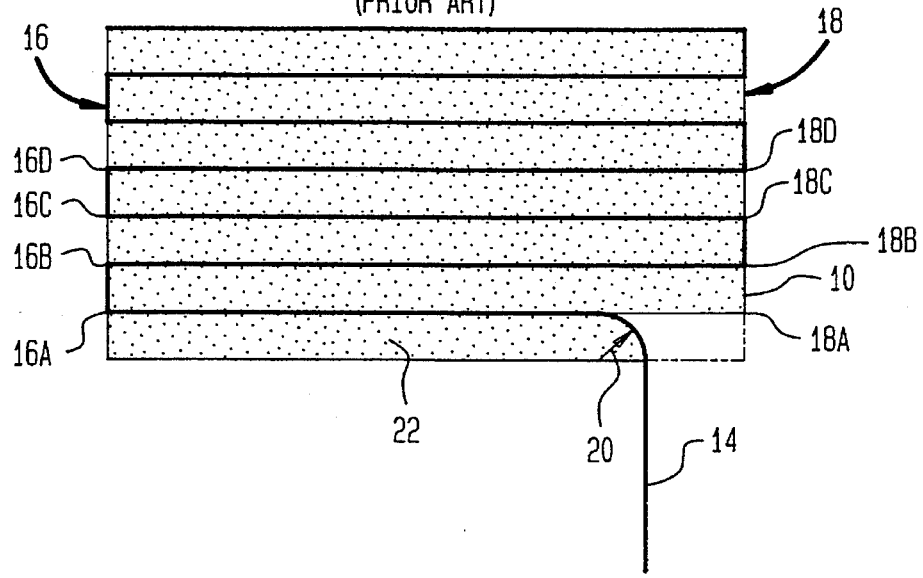
Figure 4C:
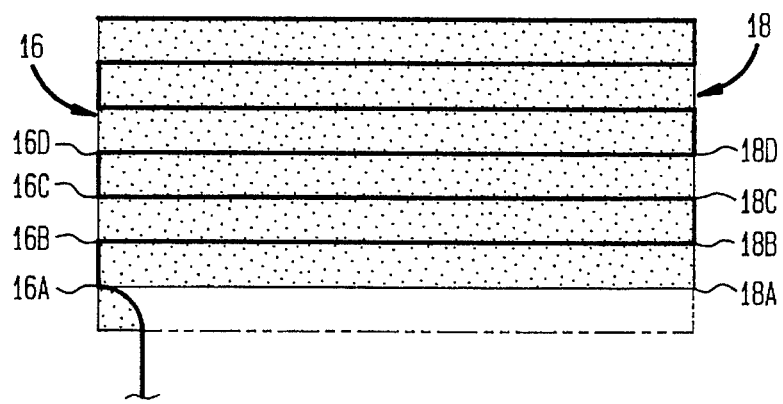

FIGS. 4A–4G show why the FIG. 3 pattern comes about. As is shown there, the cable end 14 of the cable 12 is normal to the last leg of the serpentine pattern in which the cable 12 is laid down. When the cable end 14 is pulled directly downwardly as viewed in FIG. 4A, this force places the cable 12 in tension. Because the cable 12 is pulled downwardly as viewed in FIG. 4A and the cable 12 is horizontal as viewed in FIG. 4A, the cable 12 bends in a circular arc having radius 20 as the cable 12 cuts the layer 10. This is shown in FIG. 4B. As pulling upon the end 12 continues, the cable 12 cuts region 22 from the right end 18 towards the left end 16 in FIG. 4. This continues until the cable 12 reaches the position shown in solid lines at the left end 16 of the pattern and the left side of FIG. 4C. At this position, the forces exerted by the cable 12 are different from what they were before.

Figure 4D:
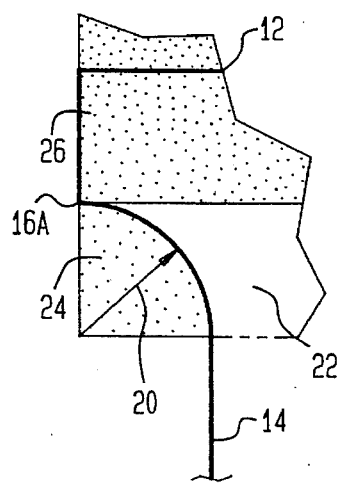
Figure 4E:
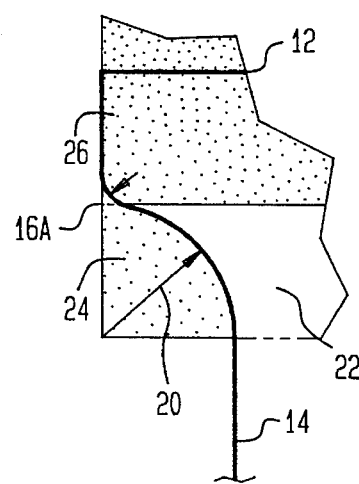
Figure 4F:
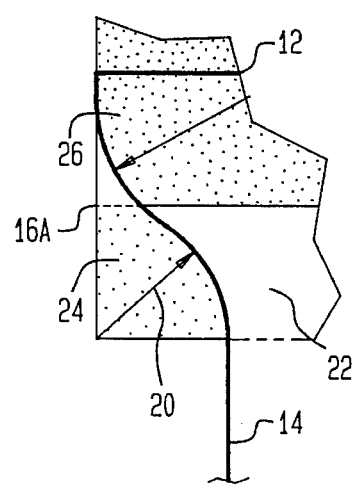

Once the cable 12 reaches the position shown in solid lines at the left end 16 of the pattern and the left side of FIG. 4D, the tension in the cable 12 is transmitted along two opposed directions. This may be best understood from FIG. 4D, which is an enlarged view of the lower left portion of FIG. 4C adjacent the endpoint 16A. One direction is into region 24 (the uncut region bounded on the right by the cable 10 and bounded on the top by the last leg of the pattern), and the other is into the lower left corner of region 26 (above the endpoint 16A). The force exerted by the cable 12 at any point along its length is proportional to a) the tension in the cable 12 and b) the sharpness of the curve of the cable 12 at that point. Because the radius 20 of the region 24 is comparatively large and the lower left corner of region 26 is a right angle and therefore quite sharp, a greater force is exerted against the lower left corner of region 26 than against any point along the perimeter of the region 24. For this reason, the lower left corner of region 26 gives way before any part of the region 24 does (see FIG. 4E), and the cable 12 begins to cut the lower left corner of the region 26 while leaving the remainder of the region 24 uncut (see FIG. 4F).

Figure 4G:
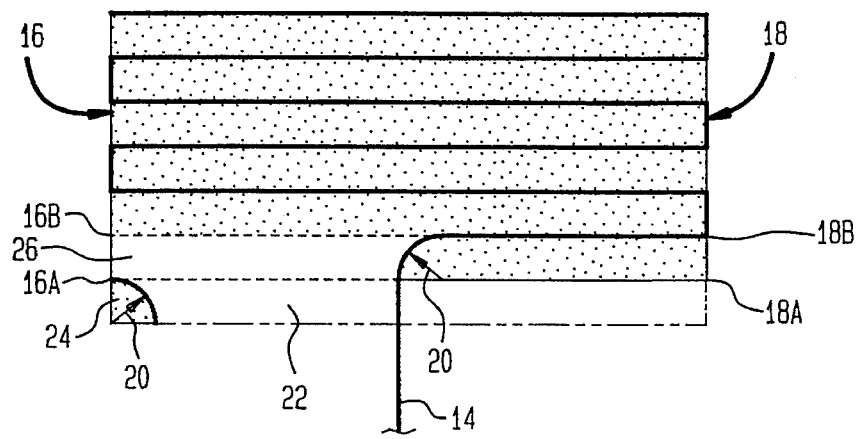

As the cable end 14 is pulled out, cutting of the region 26 (likewise with a radius 20) continues towards the right end 18 as shown in FIG. 4G. The above-described cutting action then takes place at the endpoint 18B of the next leg of the pattern of wire 12, eventually causing the FIG. 3 pattern of residue to be created.

In accordance with the invention, the regions R are so greatly reduced that they may almost be considered to have been eliminated. Since the regions R are so small, it is easy to remove them after the parts have been separated. The operation of the invention will be initially explained with reference to the first preferred embodiment.

Figure 5:
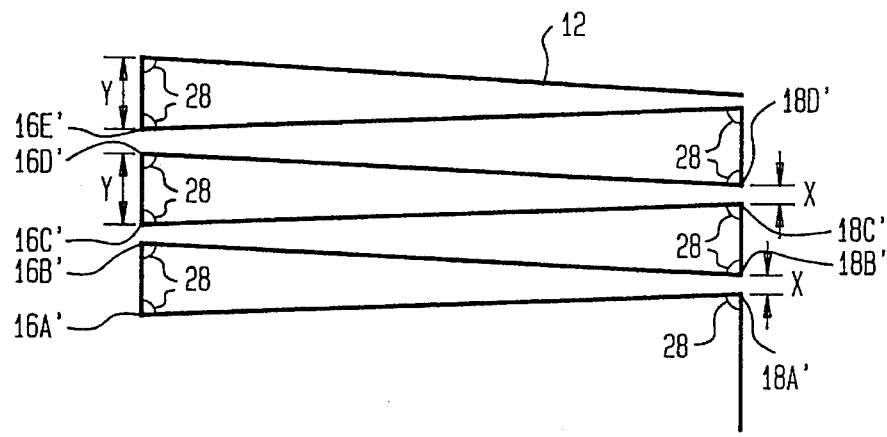
FIG. 5 schematically shows a first preferred embodiment in accordance with the invention.

In accordance with the first preferred embodiment of the invention, the serpentine pattern in which the cable 12 is laid down is required to meet a predetermined constraint. This constraint is that adjacent generally straight line segments of the cable 12 must bound acute angles 28, such that the distances X between two adjacent unconnected endpoints (e.g. 16B', 16C' and 18A', 18B') of the pattern are smaller—advantageously much smaller—than the distances Y between two adjacent connected endpoints (e.g. 18A', 18B'). This is shown in FIG. 5. Advantageously, distance Y should be at least 1.5 times distance X, but this depends upon the specific application and is not required. (As is discussed below, the greater the ratio Y/X, the more acute will be the angles 28 and the smaller will be the regions of adhesive in the layer 10 which remain after the blanket 6 has been removed from the vane 2.)

Figure 6A:
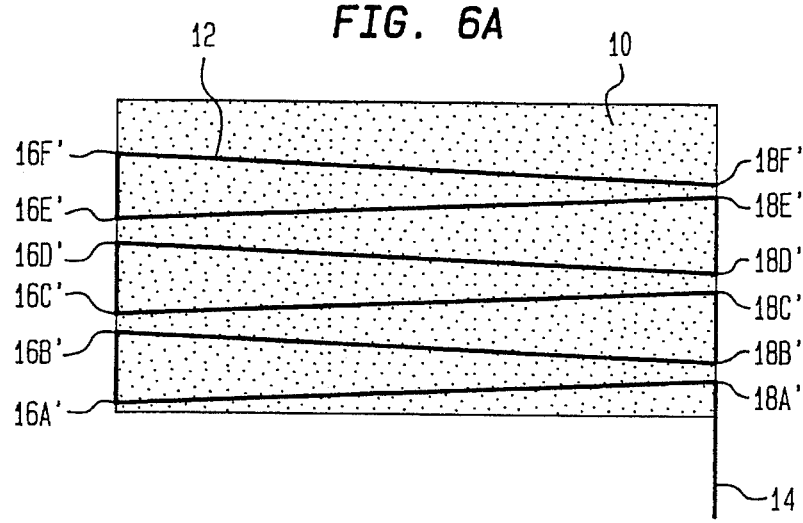
FIGS. 6A–6C schematically explain why the FIG. 5 preferred embodiment leaves only a regular and relatively small pattern of residual adhesive on the metal vane.
Figure 6B:
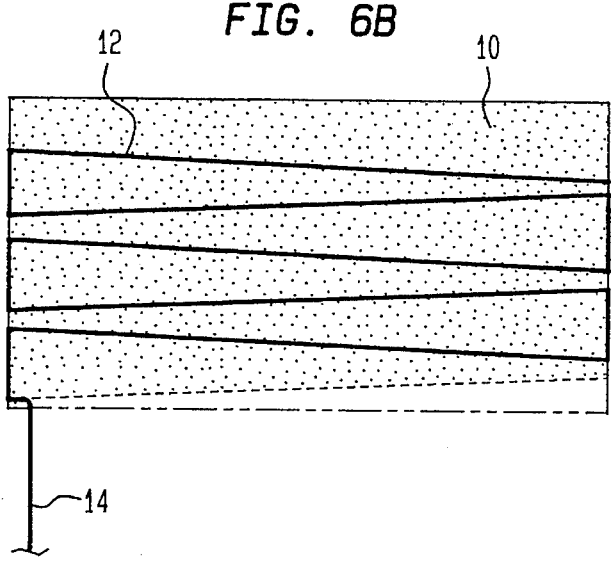
Figure 6C:
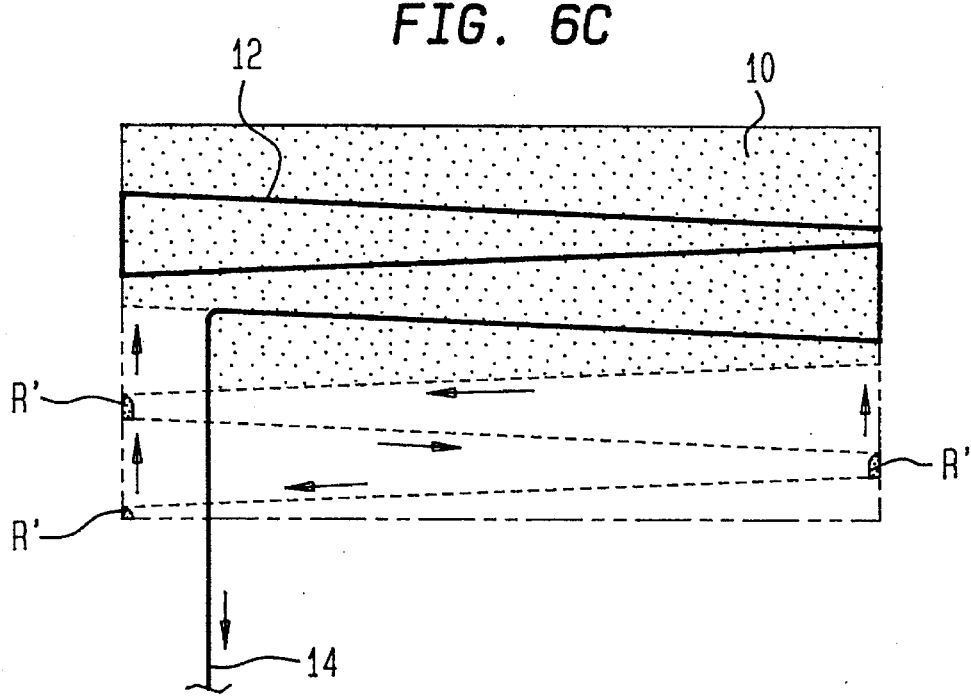

The first preferred embodiment of the invention performs as is shown in FIG. 6. As described above, the cable 12 curves as it cuts the layer 10 of adhesive, immediately adjacent the cable end 14 (which is always pulled out straight). This curvature continues to exist until the cable end 14 reaches the endpoint 16A' of the last leg of the pattern. At this endpoint 16A', there is still some uncut adhesive in the layer 10, but because the last leg of pattern of the cable 12 is so close to the edge of the vane 2, the region R' of uncut adhesive has a small area. As the cable end 14 continues to be pulled, the next-to-last leg of the pattern of the cable 12 then begins to cut the layer 8 from left to right towards the endpoint 18B'. As before, only a small region R' of uncut adhesive in the layer 8 remains at the right endpoint 18B', because the endpoint 18A' on the right end 18 was so close to this endpoint 18B' on the pattern of the cable 12. This continues until the cable 12 has been entirely removed. The adhesive layer 10 is almost completely severed, and only small regions R' of uncut adhesive remain on the vane 2. These can easily be removed.

The size of the regions R' which are left on the vane 2 in accordance with this first preferred embodiment of the invention is determined by the ratio of Y/X (provided however that Y must be larger than X). The larger this ratio is chosen to be, the smaller will be the size of the regions R'. Furthermore, the regions R' exist wherever there are two adjacent unconnected endpoints (e.g. 16B' and 16C', 18A' and 18B') which are not connected by the cable 12. Additionally, pairs of adjacent unconnected endpoints (e.g. 18A' and 18B') are located intermediate corresponding pairs of adjacent connected endpoints (e.g. 16A' and 16B') at the other end of the pattern.

Each of the line segments in the pattern of the cable 12 may not be absolutely straight. Additionally, the acute angles 28 may not be absolutely identical. Such small imperfections do not affect the performance of the first preferred embodiment of the invention.

Figure 7:
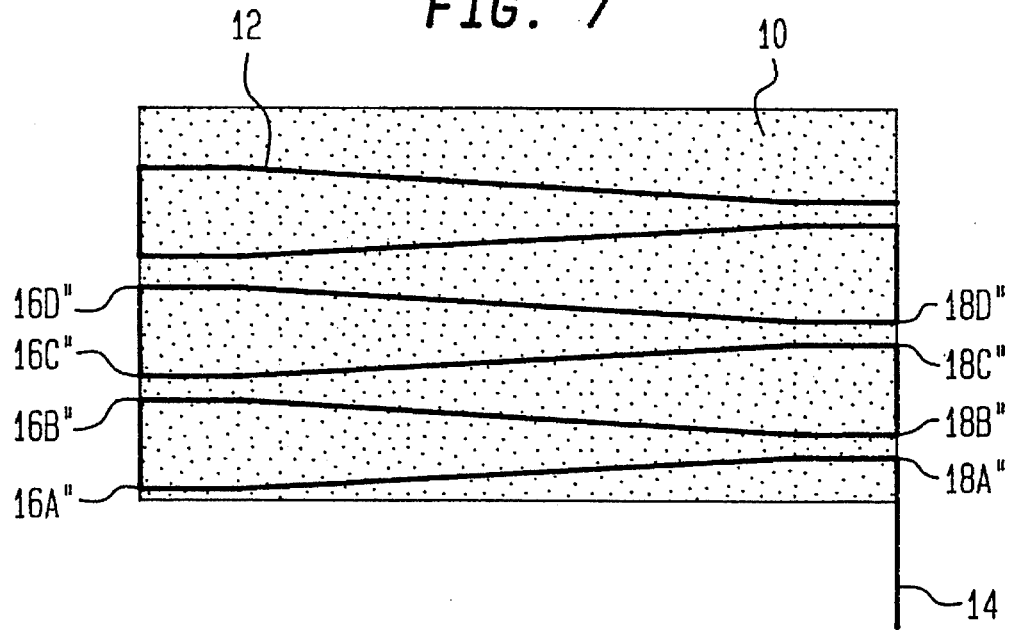
FIG. 7 schematically shows a second preferred embodiment in accordance with the invention.

In a second preferred embodiment shown in FIG. 7, the pattern of the cable 12 remains serpentine, there are likewise left and right ends (16" and 18" respectively), the distances between adjacent unconnected endpoints (e.g. 16B" and 16"C) remain small as compared with the distances between adjacent connected endpoints (e.g. 16A" and 16B") and the adjacent unconnected endpoints on one end (e.g. 18A" and 18B") are intermediate adjacent connected endpoints (e.g. 16A" and 16B") at the other end. However, the pattern between connected endpoints on opposed sides (e.g. 18A" and 16A") is different.

Advantageously, but not necessarily, the cable 10 is made of a plurality of twisted-together strands of an aramid yarn such as that which is sold under the KEVLAR® trademark. Alternatively, high tensile strength steel wire may be used. In the preferred embodiment, three strands are used. This has the following advantages:

1) For cable of equal tensile strength, a stranded cable is more flexible and therefore is easier to handle.

2) A stranded cable has more surface roughness than does a single strand of cable and therefore cuts the layer 8 more efficiently.

Advantageously, when two parts are to be bonded together in accordance with the invention, a layer of adhesive is applied to one of the parts. Then, a twisted multi-wire cable is laid down in the layer in a serpentine pattern, with a free end of the wire extending out of the layer. The serpentine pattern extends between two ends and has endpoints along those ends, and is so arranged that adjacent unconnected endpoints are separated by distances which are small with respect to distances between adjacent connected endpoints and adjacent unconnected endpoints at one end of the pattern are intermediate adjacent connected endpoints at the other end of the pattern. The second part is then placed upon the layer and cable and the adhesive is allowed to cure.

The cable need not necessarily be laid down in the layer of adhesive in a separate step. It is alternatively possible to provide, on a suitable release layer, a layer of adhesive in which the cable is already contained in a serpentine pattern in accordance with the invention.

Although a preferred embodiment has been described above, the scope of the invention is limited only by the following claims:

I claim:

1. A method of separably adhesively bonding two parts together in such a manner that any remaining adhesive can be easily removed after separation of the parts, comprising the following steps:

placing a flexible cable-containing layer of adhesive between the two parts, said cable being arranged in a serpentine pattern which extends between two ends and having endpoints along those ends, said pattern being so arranged that adjacent unconnected endpoints are separated by distances which are small with respect to distances between adjacent connected endpoints and adjacent unconnected endpoints at one end of the pattern are intermediate adjacent connected endpoints at the other end of the pattern, and said cable having a free end which extends outside the layer; and adhesively bonding the parts together using said layer of adhesive, whereby said adhesive layer is removable after the parts have been bonded together by pulling out said cable, and further whereby said pattern is such that any adhesive remaining after said cable has been pulled out is easily removed.

2. A method of separably adhesively bonding two parts together in such a manner that any remaining adhesive can be easily removed after separation of the parts, comprising the following steps:

placing a flexible cable-containing layer of adhesive between the two parts, said cable being arranged in a serpentine pattern and having a free end which is outside the layer, and said pattern being made up of generally straight line segments wherein each two adjacent line segments bound an acute angle; and adhesively bonding the parts together using said layer of adhesive, whereby said adhesive layer is removable after the parts have been bonded together by pulling out said cable, and further whereby said pattern is such that any adhesive remaining after said cable has been pulled out is easily removed.

3. The method of claims 1 or 2, wherein the adhesive is a polysulfide rubber.

4. The method of claims 1 or 2, wherein the cable is of wire.

5. The method of claim 4, wherein the wire is high tensile strength steel.

6. The method of claim 4, wherein the cable comprises a plurality of wires which are twisted together.

7. The method of claims 1 or 2, wherein the cable is an aramid yarn.

* * * * *